(12) United States Patent
Massey

(10) Patent No.: US 7,021,838 B2
(45) Date of Patent: Apr. 4, 2006

(54) OPTIMIZING ALIGNMENT OF AN OPTICAL FIBER TO AN OPTICAL OUTPUT PORT

(75) Inventor: Brian Massey, Marlborough, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 110 days.

(21) Appl. No.: 10/737,451

(22) Filed: Dec. 16, 2003

(65) Prior Publication Data

US 2005/0129371 A1    Jun. 16, 2005

(51) Int. Cl.
G02B 6/36 (2006.01)
G02B 6/42 (2006.01)

(52) U.S. Cl. .............................. 385/91; 385/52; 385/90

(58) Field of Classification Search ................ 385/39, 385/50–52, 88, 91, 134, 136, 90
See application file for complete search history.

(56) References Cited

U.S. PATENT DOCUMENTS

| | | | |
|---|---|---|---|
| 4,008,948 A | 2/1977 | Dalgleish et al. | |
| 4,174,491 A | 11/1979 | Nakamura et al. | |
| 4,237,474 A | 12/1980 | Ladany | |
| 4,500,165 A | 2/1985 | Scholl et al. | |
| 4,663,652 A | 5/1987 | Nishizawa | |
| 4,702,547 A | 10/1987 | Enochs | |
| 4,741,796 A | 5/1988 | Althaus et al. | |
| 4,778,241 A | 10/1988 | Haltenorth | |
| 4,779,788 A | 10/1988 | Rossberg | |
| 4,798,439 A | 1/1989 | Preston | |
| 4,818,056 A | 4/1989 | Enochs et al. | |
| 5,033,052 A * | 7/1991 | Masuko et al. | 372/36 |
| 5,077,878 A | 1/1992 | Armiento et al. | |
| 5,163,108 A | 11/1992 | Armiento et al. | |
| 5,227,646 A | 7/1993 | Shigeno | |
| 5,228,101 A | 7/1993 | Lebby et al. | |
| 5,345,529 A | 9/1994 | Sizer, II et al. | |
| 5,412,748 A | 5/1995 | Furuyama et al. | |
| 5,535,296 A | 7/1996 | Uchida | |
| 5,559,918 A | 9/1996 | Furuyama et al. | |
| 5,602,955 A | 2/1997 | Haake | |
| 5,619,609 A * | 4/1997 | Pan et al. | 385/136 |
| 5,745,624 A | 4/1998 | Chan et al. | |
| 5,768,456 A | 6/1998 | Knapp et al. | |
| 5,881,198 A | 3/1999 | Haake | |
| 5,896,481 A | 4/1999 | Beranek et al. | |
| 6,146,025 A | 11/2000 | Abbink et al. | |
| 6,164,837 A | 12/2000 | Haake et al. | |
| 6,184,987 B1 * | 2/2001 | Jang et al. | 356/388 |
| 6,207,950 B1 | 3/2001 | Verdiell | |
| 6,216,939 B1 | 4/2001 | Thackara | |
| 6,282,350 B1 | 8/2001 | Takahashi et al. | |

(Continued)

Primary Examiner—John D. Lee
Assistant Examiner—James D. Stein
(74) Attorney, Agent, or Firm—RatnerPrestia

(57) ABSTRACT

A method of optimally aligning an optical fiber to a semiconductor laser diode, aligns the optical fiber to the semiconductor laser diode, attaches a solder preform onto the optical fiber, and applies a low power localized heat to the solder preform in order to thermally shift the optical fiber downward into an optimized alignment. The method may further include intermediate alignment steps including application of a preload force on the fiber in a direction compensatory to the direction of misalignment, and activation of a high power localized heat to reflow the solder so that the fiber may be moved to the optimized position. These steps may be performed multiple times until a substantially optimized coupling is achieved.

18 Claims, 5 Drawing Sheets

U.S. PATENT DOCUMENTS

| | | |
|---|---|---|
| 6,415,167 B1 | 7/2002 | Blank et al. |
| 6,440,776 B1 | 8/2002 | Musk |
| 6,614,605 B1 * | 9/2003 | Auracher et al. ........... 359/824 |
| 6,623,180 B1 | 9/2003 | Panicker et al. |
| 6,652,158 B1 | 11/2003 | Bartur et al. |
| 2001/0010742 A1 | 8/2001 | Nakagawa et al. |
| 2002/0110328 A1 | 8/2002 | Bischel et al. |
| 2003/0210866 A1 | 11/2003 | Kuhara et al. |
| 2003/0223709 A1 | 12/2003 | Lake et al. |
| 2004/0124345 A1 * | 7/2004 | Sell ....................... 250/227.11 |
| 2004/0223721 A1 * | 11/2004 | Flanders et al. ............ 385/147 |

* cited by examiner

OPTIMIZING ALIGNMENT OF AN OPTICAL FIBER TO AN OPTICAL OUTPUT PORT

TECHNICAL FIELD

The present invention relates generally to fiber-coupled optical assemblies and, more particularly, to a method of aligning an optical fiber to an optical output port.

BACKGROUND OF THE INVENTION

The importance of achieving accurate mutual alignment of individual components in any optical system is well known. The miniature dimensions of components used in modern optical communication systems render such alignment difficult both to achieve and to maintain. For example, one problem in the construction of laser transmitters is that of efficiently coupling the optical output from a laser diode into an optical fiber. To obtain efficient coupling, the fiber end is desirably precisely aligned with the emitting area of the laser. When such alignment is achieved, the fiber is then fixed in place, ideally by a method that ensures alignment is sustained throughout the device lifetime.

Typically, fiber-coupled diode lasers are packaged in gold plated metal packages and the fiber is held in alignment with the laser using either epoxy, laser weld, or solder attachment techniques with or without a ferrule. Epoxy attachment is low cost but may have too much thermal expansion for high precision attachments. Furthermore, it is not reliable over a long period of time due to outgassing and alignment shifts arising from aging and temperature cycling. Laser weld techniques are reliable but require costly ferrulization of the fiber and specially designed mounts or clips to allow weld attachment of the ferrulized fiber. The mounts/clips are expensive, large, and may creep over time. Solder attachment techniques, on the other hand, are reliable and low cost, and have become prevalent in the art. However, existing solder attachment techniques tend to use either an integrated heating mechanism and/or a specially configured platform to isolate the heat for a solder reflow. These tend to be expensive and undesirably large.

The mounting point at which the fiber is soldered desirably has specific material properties in order to work effectively. An acceptable material for the mounting point desirably has a low thermal conductivity (e.g. less than 50 W/m-K) and a thermal expansion coefficient that maintains fiber alignment while the package is heated. The exact thermal expansion property desired may depend on the material to which the laser is mounted, the respective thickness of the fiber mount and laser submount, and/or the temperature profiles expected during operation. The fiber mount material also may be able to be soldered or be able to be plated with a solderable material. During the soldering process, the fiber mount may experience significant stress resulting from differential expansion due to temperature gradients and materials differences. Therefore, the fiber mount desirably has a high tensile strength (e.g. greater than 25 kpsi) to avoid fracturing.

It is difficult, however, to maintain alignment between the optical component and the fiber when the fiber soldered due to turbulent flows and capillary forces exhibited by the molten solder.

SUMMARY OF THE INVENTION

The present invention is embodied in a method of aligning an optical fiber to an optical output port, the method comprising the steps of aligning the optical fiber to the optical output port, attaching the optical fiber to a mount pad region using heat activated attachment means, wherein at least a vertical misalignment of the fiber and optical output port is caused therein, and activating a localized heating means to generate heat on the attachment means to adjust the fiber at least vertically to an optimized position.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
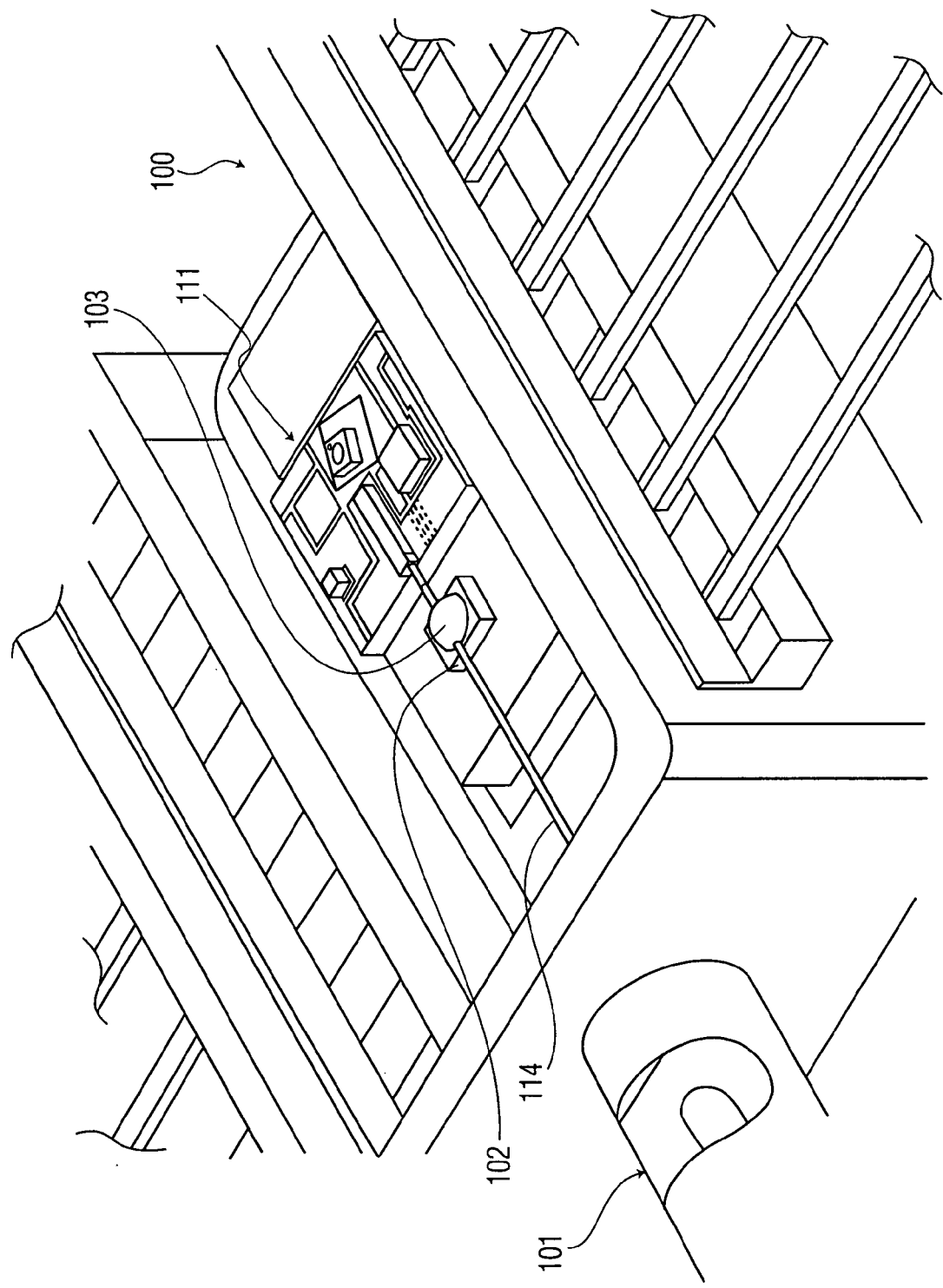
FIG. 1 is a perspective view of a fiber-coupled optical component package showing the snout feedthrough for an optical fiber and the optical fiber soldered to a separate mount component within the package, according to the prior art.

Referring now to the drawing, in which like reference numbers refer to like elements throughout the various figures that comprise the drawing, FIG. 1A shows a package 100 according to the prior art. The prior art package 100 includes optical fiber 114 inserted through snout feedthrough 101 and attached to fiber mount 102 with solder 103. Optical fiber 114 is also optically coupled to optical component 111 (e.g. semiconductor laser). It can be seen that optical fiber 114 is mounted on a separate fiber mount 102 than optical component 111 and that there may be the lack of an available side view on the area where fiber 114 is to be aligned and coupled to optical component 111. Further, the insertion of fiber 114 through snout feedthrough 101 may require a non-vertical manufacturing process, which may cause complications in the manufacturing process resulting in yield issues. In aligning optical fiber 114 to optical component 111, there may be the lack of available camera views on the alignment process. Additionally, optical fiber 114 is attached to fiber mount 102 by application of a drop of molten solder 103, which may result in a change in the alignment prior to attachment.

It can be seen that the coupling efficiency achieved by the alignment in the prior art package 100 described above may be undesirably low for high-precision optical fibers and semiconductor lasers.

In the present invention, a method is presented for aligning an optical fiber to an optical output port. The optical output port may generally include any surface which may receive an optical signal or from which an optical signal may radiate, such as the output port of a single mode semiconductor laser, a multi-mode semiconductor laser, an optical mirror, a second optical fiber, a semiconductor optical amplifier, an optical concentrator, and a light-emitting diode. Further, the optical fiber may be one of a metallized or non-metallized wedge-lensed, ball, conical, and flat-cleaved fiber.

In one embodiment of the present invention, the method of aligning the optical fiber to the optical output port comprises the steps of aligning the optical fiber to the optical output port, securing the optical fiber using a heat sensitive attachment means, wherein at least a vertical misalignment of the fiber and optical output port is caused thereby, and activating a localized heating means to generate heat on the attachment means to adjust the fiber at least vertically toward a desired position.

It may be possible that a misalignment between the optical fiber and the source may damage the entire assembly during operation. An optical output device may output, for example, a signal with power exceeding 100 mW. This power level may be sufficient to destroy metallization or to melt the wedge tip of a misaligned optical fiber.

Furthermore, in order to perform a precise alignment of the optical fiber to the optical output source, it may be desirable to activate the optical output source and observe the coupling efficiency using an optical power meter. Therefore, in order to minimize the occurrence of the damage described above in a precise alignment stage of a manufacturing process, a vision system may be used initially, to passively align the optical fiber to the source, or the source to the fiber. This reduces misalignment between the components before the source power output is increased for high power efficiency measurements and adjustments. It may also be desirable to start the active alignment process with a low power optical output signal to minimize the possibility of damage. Further alignment, however, may be performed at high power output settings in order to effectively measure coupling efficiency. Those skilled in the art will recognize that many methods may be used where the optical fiber is moved in a pattern to achieve a substantially optimized alignment to the output port of the optical device. Among such movement methods are line and raster scans, as well as a newly developed diamond scan by the inventors of the subject application.

A diamond scan method of substantially optimizing alignment of the optical fiber to the output port of the optical device may generally require finding first light from the optical output port, whereby the point of first light is designated as a center point of a diamond. The method may then move the optical fiber to the right of the center point onto a vertex of the diamond where a power coupling efficiency measure is made. The fiber may then be moved clockwise or counterclockwise onto the remaining 3 vertices of the diamond shape, where measures of power coupling efficiency are made at each of the remaining 3 vertices of the diamond shape. The process then determines which of the data points (i.e., 4 vertices and 1 center) achieved the highest coupling efficiency, and then proceeds to designate that point as being the new center of the diamond shape, repeating the process described above. The process continues to search according to the process above until the point of highest coupling efficiency remains static on a certain point, whereby the process then reduces the size of the diamond shape and continues to scan again according to the above description. The method described above, therefore, may provide continuous real-time scanning and optimization of optical coupling between the optical fiber and the output port of the optical device.

Figure 2:
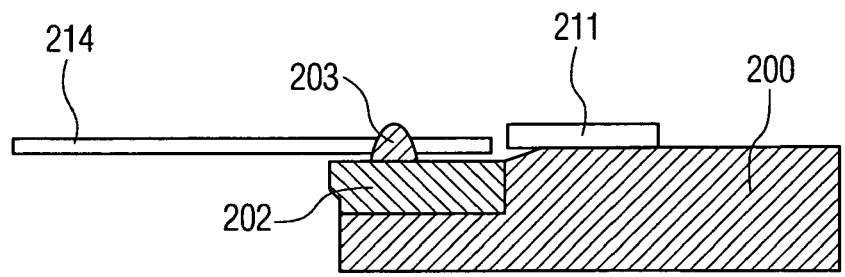
FIG. 2 is a side plan drawing of an optical fiber aligned to an optical component, according to the present invention.

Once a desirable alignment has been achieved, the optical fiber is attached to a mount pad region using a heat sensitive attachment means. In one embodiment of the invention, the heat sensitive attachment means is placed on at least an end section of the optical fiber and over the mount pad region, as illustrated in FIG. 2, which shows optical fiber 214 optically coupled to semiconductor laser 211 atop high thermal conductivity base 200, where attachment means 203 is applied on an end section of optical fiber 214 and over mount pad 202.

The heat sensitive attachment means may be, for example, a metallic or glass solder preform, a drop of molten metallic or glass solder or a heat-sensitive adhesive.

In an embodiment of the present invention, the attachment of the optical fiber to the mount pad region using the attachment means may include the steps of providing a preform solder as the heat sensitive attachment means on at least an end section of the optical fiber and over the mount pad region, and applying the localized heating means to generate heat on, and reflow, the solder.

The localized heating means may generally include any method of applying heat to the attachment means sufficient to cause the optical fiber to be secured to the mount pad region. Also, it may be desirable to perform the method in an ambient nitrogen or argon atmosphere in order to prevent undesirable oxidation of system components.

Figure 3:
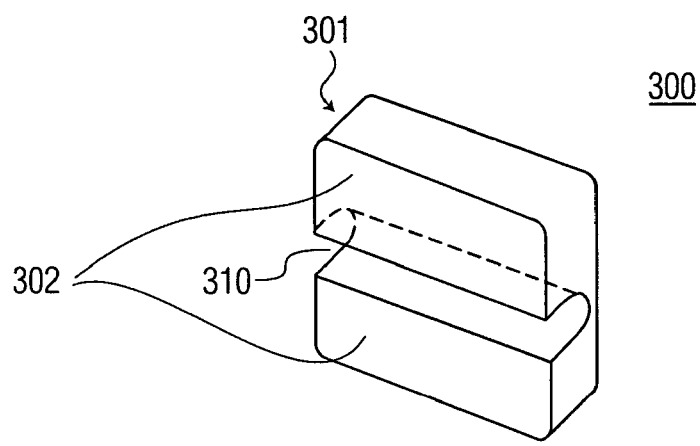
FIG. 3 is a perspective drawing of a substantially rectangular solder preform that may be used in the present invention.

In one embodiment, the localized heating may be achieved by activating one or more lasers to emit at least one continuous beam of light, where the at least one beam is incident on the attachment means, which may be a solder preform 300, shown in FIG. 3. The solder preform 300 generally may have solder material on at least a bottom surface 302 thereof. A groove 310 is provided in body 301 to fit an optical fiber (not shown in FIG. 3), such that preform 300 may be placed on an end section of the optical fiber (not show in FIG. 3) and over a mount pad region (not shown in FIG. 3). In the embodiments of the invention where the localized heating means includes application of laser radiation, it is desirable to shield the optical fiber from the laser radiation. Thus, it may be desirable to provide a heat attachment means that substantially shields the optical fiber from the laser radiation. This is accomplished with the solder preform 300 shown in FIG. 3, but may also be achieved by fitting a sleeve over at least an end section of the optical fiber, and applying one or more of a heat sensitive adhesive, a drop of molten solder, a wire feed of solder, and epoxy over at least an end section of the optical fiber.

Figure 4:
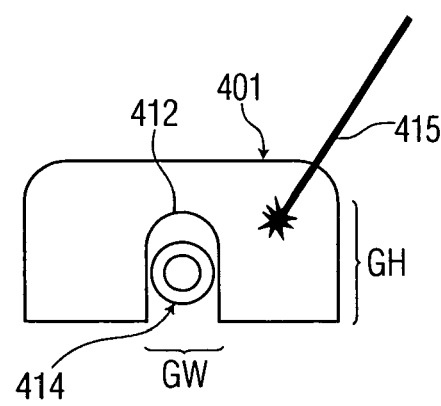
FIG. 4 is a front plan drawing of the preform in FIG. 3 with an optical fiber placed within the groove and laser radiation incident on the preform according to the present invention.

FIG. 4 shows an optical fiber 414 contained within preform groove 412 having a groove height GH and a groove width GW. It can be seen that preform 401 desirably shields the enclosed fiber 414 from the application of laser radiation 415 to melt preform 401.

In a further embodiment, the laser heating may be done using one or more lasers activated on the solder preform in a continuous wave mode using a medium power setting (i.e., 20 W to 30 W) for 0.5 to 6 seconds. This provides sufficient heating to completely reflow the gold-tin solder of the exemplary embodiment, and also allows the solder to retain its shape around the optical fiber. Generally, those skilled in the art may recognize that the power settings may be desirably adjusted for other types of solder materials being used.

In embodiments where a metallic solder is used, it may be desirable to use an optical fiber metallized on at least an end section thereof. Alternately, a non-metallized optical fiber may be used with a glass solder. In a further embodiment, a bare glass fiber may be used with metallic solder, with slip between the fiber and solder being desirably minimized by the use of an adhesive, for example, an optical epoxy having low outgassing, low coefficient of thermal expansion and low movement during cure or thermal excursions. Epoxies suitable for this purpose are OP-60-LS and OP-63-LS available from DYMAX corporation. Ideally, the epoxy is used on the far side of the solder/fiber interface (i.e., opposite to the laser).

Upon attaching the optical fiber to the mount pad region using the heat sensitive attachment means, there may be at least a vertical misalignment of the fiber and optical output port caused, for example, by capillary forces exhibited by the molten solder. Therefore, it is desirable to align the optical fiber to a desired position, so that it may approach an optimal coupling with the optical output port. In one embodiment of the present invention, this may be achieved by activating a localized heating means to generate heat on the attachment means to adjust the fiber at least vertically toward a desired position.

In a further embodiment, the further alignment of the optical fiber may comprise the steps of obtaining information on the position of the optical fiber with the attachment means thereon, determining a preload direction in which to apply a preload force by comparing the determined position to the desired position of the optical fiber, and applying the preload force in the preload direction before activation of the localized heating means. The step of activating the localized heating means then causes the solder to reflow, allowing the fiber to move under influence of the preload force. Alternately, the application of the preload force in the preload direction may be performed concurrently with the activation of the localized heating means. Additionally, the steps described above may be performed iteratively until the optical fiber is substantially aligned in the desired position. In an exemplary embodiment, it may be desirable to keep movement of the fiber under influence of the preload force to a certain maximum distance so as to minimize mechanical stresses in the fiber. Therefore, in such an embodiment, it may be required to iteratively perform the process described above in order to achieve a desirable alignment of the optical fiber and the optical output port.

Furthermore, the step of activating the localized heating means may include activating at least one laser to emit at least one beam of light, where the at least one beam is incident on the solder. In an exemplary embodiment, this beam may include at least one high energy pulse of 25 W to 35 W, with pulse width of 20 to 30 ms and a duty cycle of about 80%. When it is desirable to use more than one pulse, there may be pause of approximately 6 ms in between consecutive pulses. Other localized heating means may also be used, as described above.

In an alternate embodiment of the present invention, there may be only a vertical misalignment introduced by the attachment of the optical fiber. In this situation, a precise alignment of the optical fiber to the optical output port may be achieved by activating the localized heating means at a power setting sufficient to cause the optical fiber to thermally move vertically within the solder. It may be desirable to align the optical fiber slightly above the optical output port so that activation of the localized heating means may thermally move the optical fiber downward into a substantially optimized, or otherwise desirable, position.

Because vision system tolerances may be too imprecise to monitor the alignment in this situation, alignment may be monitored by activating an optical component to emit an optical signal from the optical output port and activating an optical power meter to monitor coupling efficiency between the optical fiber and the optical output port to determine alignment between the optical fiber and the optical output port. This process may generally be iterated until the optical fiber achieves a substantially optimized coupling efficiency with the optical output port.

Furthermore, the step of activating the localized heating means may include activating at least one laser to emit at least one beam of light, where the at least one beam is incident on the heat sensitive attachment means. In an exemplary embodiment, this beam may include at least one low energy pulse of 13–18 W, with pulse width of 20 to 30 ms and a duty cycle of approximately 80%. When it is desirable to use more than one pulse, there may be a pause of about 6 ms in between consecutive pulses. Other localized heating means may also be used, as described above.

In a further embodiment, it may be desirable to horizontally align the optical fiber in addition to the vertical alignment described above. In this embodiment, the optical fiber may also be horizontally aligned during the vertical alignment procedures above by applying a force on the fiber in the desired horizontal direction, or by applying laser radiation horizontally onto the heat sensitive attachment means to induce a horizontal movement of the fiber therein.

In an alternate embodiment of the present invention, the further alignment of the optical fiber may include the steps of obtaining top and side camera images of the optical fiber with the attachment means thereon to determine the position of the fiber, determining a preload direction in which to apply a preload force by comparing the top and side camera images to the desired position of the optical fiber, and applying the preload force in the preload direction before activation of the localized heating means. The step of activating the localized heating means then causes the solder to reflow, allowing the fiber to move under influence of the preload force. Alternately, the application of the preload force in the preload direction may be performed concurrently with the activation of the localized heating means. Additionally, the steps described above may be performed iteratively until the optical fiber is substantially aligned in the desired position. In an exemplary embodiment, it may be desirable to keep movement of the fiber under influence of the preload force to a certain maximum distance so as to minimize mechanical stresses in the fiber. Therefore, in such an embodiment, it may be required to iteratively perform the process described above in order to achieve a desirable alignment of the optical fiber and the optical output port.

It can be seen that the further alignment of the present embodiment is optimized to substantially within vision system tolerances. It may therefore, be desirable to further align the optical fiber more precisely to a desired position. In this situation, a further precise alignment of the optical fiber to the optical output port may be achieved by activating the localized heating means at a power setting sufficient to cause the optical fiber to thermally move vertically within the heat sensitive attachment means. It may be desirable to align the optical fiber slightly above the optical output port so that activation of the localized heating means may thermally move the optical fiber downward into a substantially optimized, or otherwise desirable, position. Alignment may be monitored by activating an optical component to emit an optical signal from the optical output port and activating an optical power meter to monitor coupling efficiency between the optical fiber and the optical output port. This process may generally be iterated until the optical fiber achieves a substantially optimized coupling efficiency with the optical output port.

In a further embodiment of the present invention, it may be desirable to collect data from one or more of the motion system, vision system, and optical power meter during attachment and alignment of the optical fiber in order to adapt an automated algorithm to be implemented in the manufacturing process. Additionally, the continuous acquisition and analysis of data from the attach and align components may allow a constant optimization of the automated algorithm in order to increase manufacturing efficiency.

Figure 5:
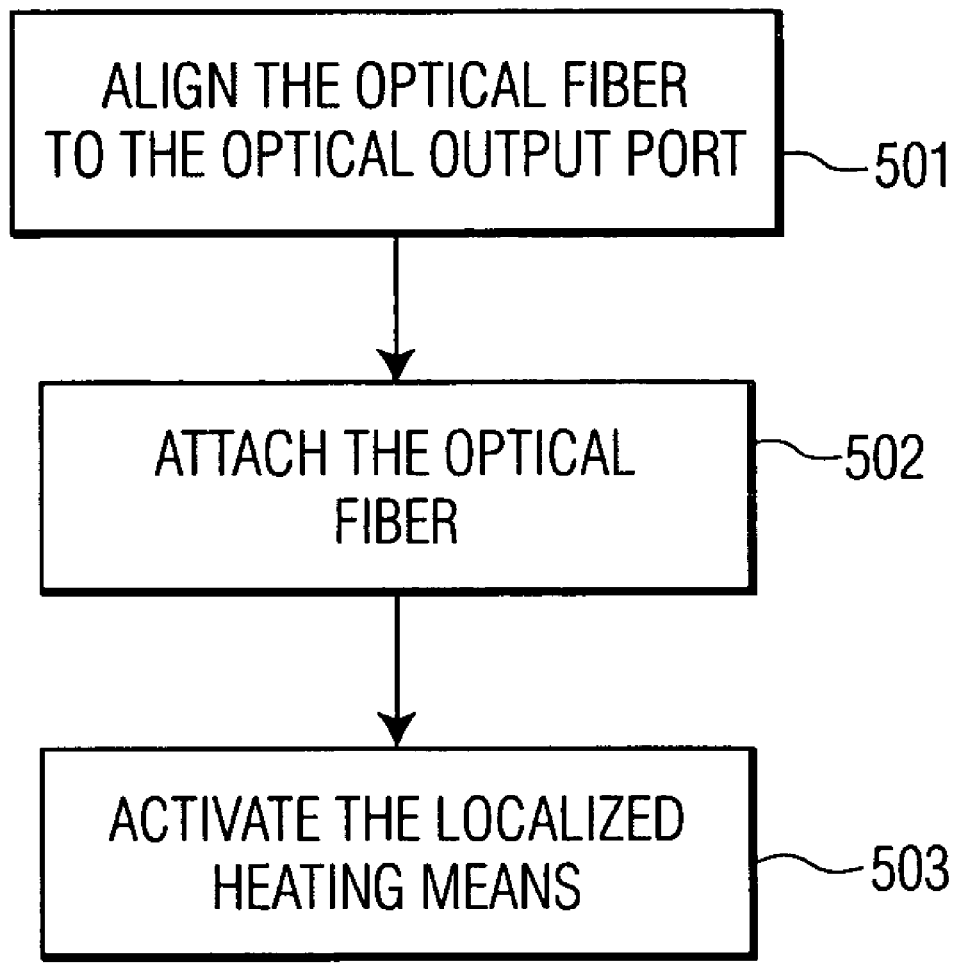
FIG. 5 is a flowchart illustrating one implementation of the method of the present invention.

FIG. 5 is a flowchart showing a general embodiment of the present invention where step 501 is an alignment of the optical fiber to the optical output port, step 502 is an attachment of the optical fiber with a heat-sensitive attachment means applied on at least an end section of the optical fiber and over a mount pad region, and step 503 is an activation of a localized heating means to adjust the optical fiber in at least a vertical direction in order to achieve a desired alignment with the optical output port.

Figure 6:
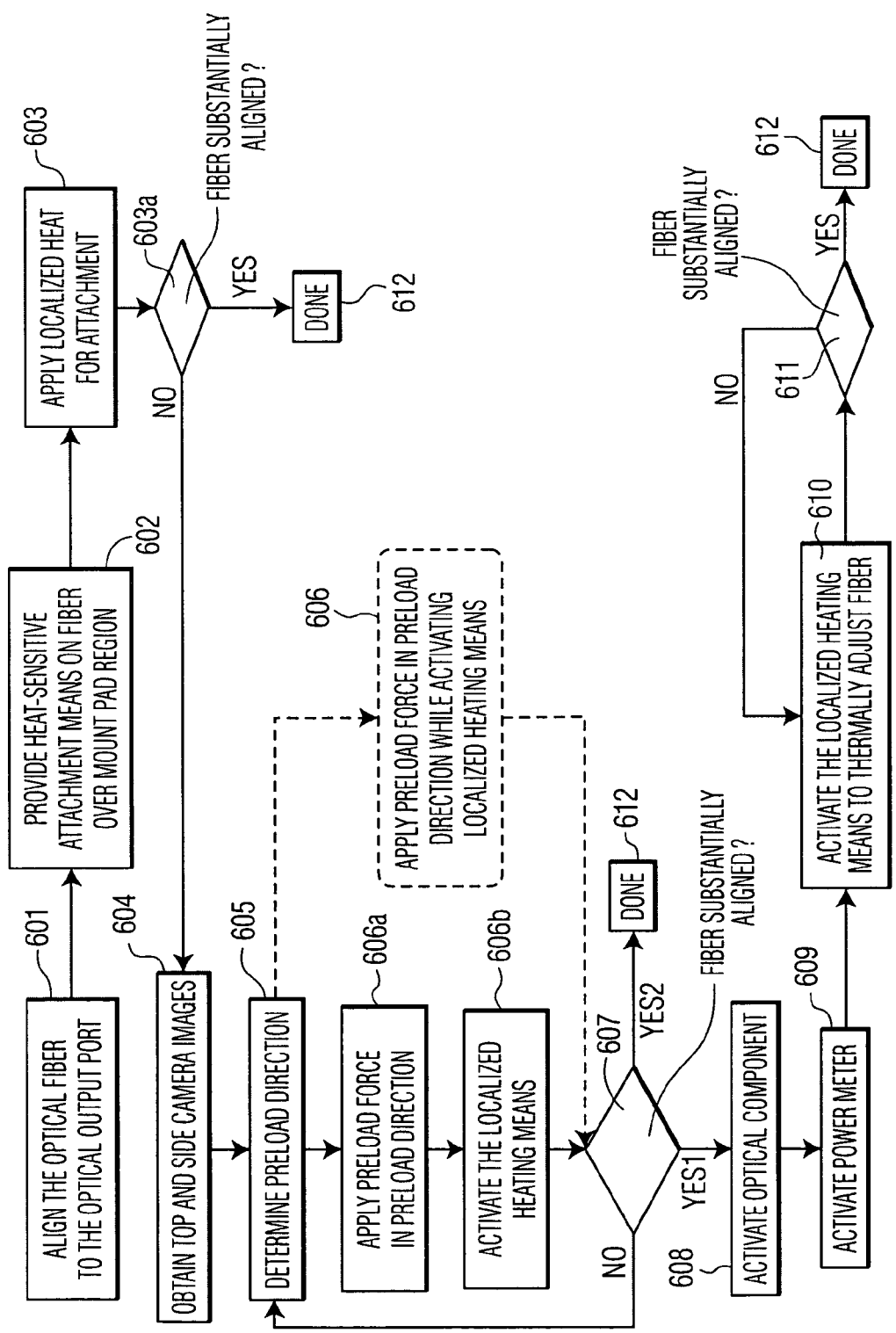
FIG. 6 is a flow chart outlining an exemplary method of aligning an optical fiber to an optical output port, according to the present invention.

FIG. 6 is a flowchart showing another exemplary embodiment of the present invention. In step 601, the optical fiber is desirably coarsely aligned to the optical output port as described above. Step 601 may also include taking top and side pictures of the optical fiber to source interface, which may be used to determine the preload direction after attachment. Step 602 provides a heat sensitive attachment means on at least an end section of the fiber and over a mount pad region, where step 603 applies a localized heat onto the heat-sensitive attachment means in order to secure the optical fiber onto the mount pad region. A misalignment in at least a vertical direction is introduced by one or more of steps 601, 602 and 603.

If no misalignment is introduced, step 603a leads to step 612, which indicates that the alignment process is complete. If there is a misalignment, then step 604 obtains top and side camera images of the optical fiber adjacent to the optical output port. Step 605 then determines a preload direction in which to apply a preload force by comparing the top and side camera images to the desired position of the optical fiber. Step 606a proceeds to apply a preload force on the optical fiber in the preload direction, and step 606b activates the localized heating means in order to substantially soften the heat attachment means to allow the fiber to move under the influence of the preload force.

Alternately, step 606 may be performed where the activation of the localized heating means and the application of the preload force are done concurrently. Step 607 then determines if the optical fiber is substantially aligned in the desired position. If not, then control transfers back to step 605. If the fiber is substantially aligned, then one of two decisions may be made. If YES2 is selected, the method transfers to step 612, which indicates that the process is complete. However, if YES1 is selected, then the process executes steps to 608–611 to further precisely align the optical fiber to achieve desirable alignment with the optical output port. In step 608, an optical component is activated to generate a signal from the optical output port. Step 609 activates a power meter that measures the coupling efficiency by measuring the signal in the optical fiber. Steps 608 and 609 may generally be performed in any sequence, or simultaneously.

Step 610 activates the localized heating means to thermally move the optical fiber within the heat-sensitive attachment means. During step 610, the coupling efficiency of the optical fiber and the optical output port is measured by the power meter. Step 611 checks this measure of coupling efficiency to determine whether or not the fiber has achieved a substantially desirable alignment with the optical output port. If not, then step 610 is repeated. If so, then control transfers to step 612, which indicates the process has come to completion. Although not shown, steps 605–707 may be eliminated from the process if it is determined, at step 604 that only vertical alignment is needed. In addition, steps 608–612 may be used to align the fiber vertically or horizontally depending on whether the laser energy is applied to the top or the side of the heat-sensitive attachment means.

Figure 7:
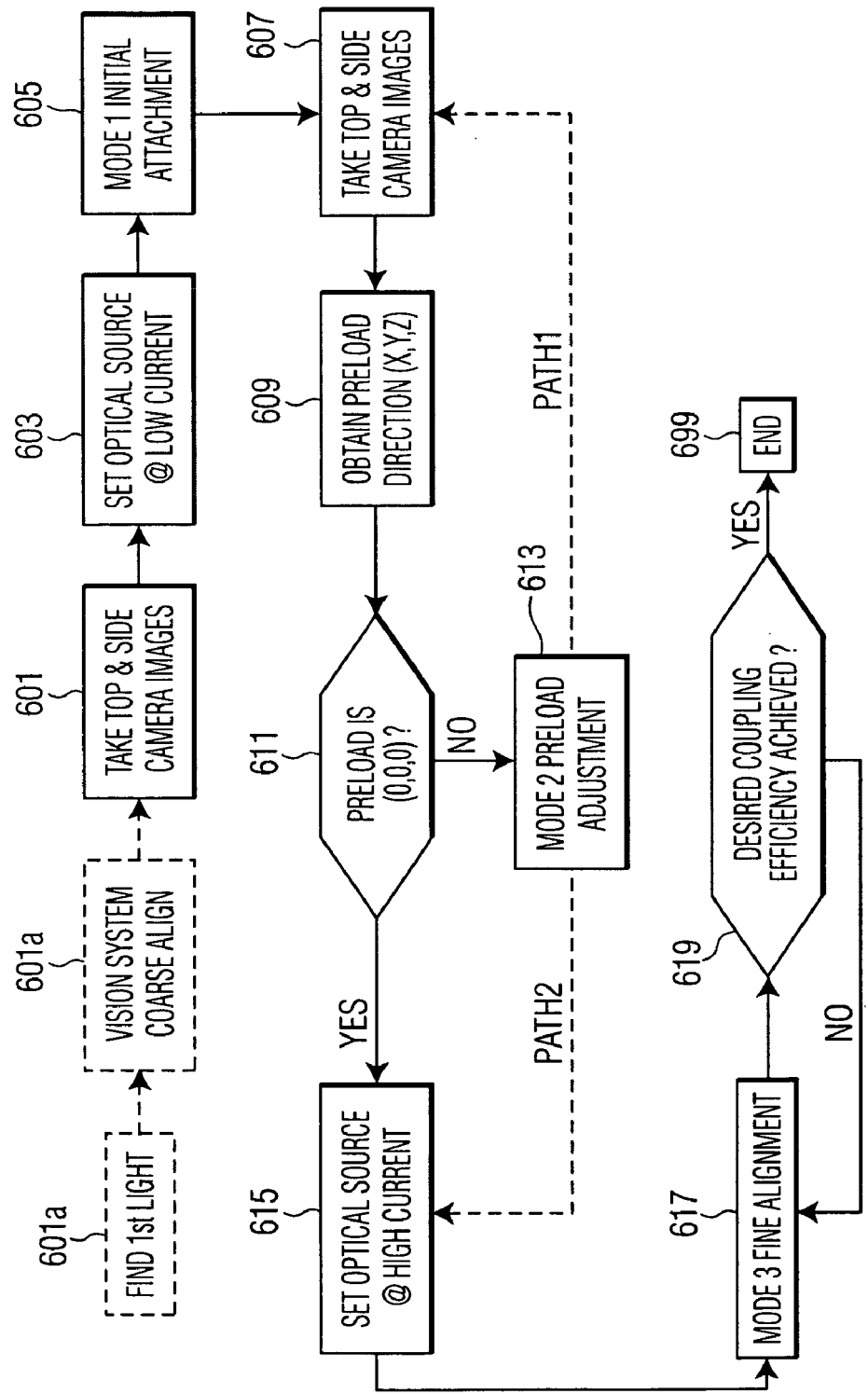
FIG. 7 is a flow chart outlining a further exemplary method of aligning an optical fiber to an optical output port, according to the present invention

FIG. 7 is a flowchart showing a further exemplary embodiment of the present invention. The method of the present exemplary embodiment generally starts from step 601, where top and side camera images are taken of an optical fiber that has been substantially pre-aligned to an optical output port. The process, however, may also include step 601a to coarsely find "first light" through the optical fiber by using a vision system, as well as step 601b to coarsely align the optical fiber to the optical output port after finding first light through the optical fiber. Alignment of the optical fiber may generally refer to the movement of the fiber while monitoring optical power reaching the fiber in order to obtain desirable optical signal coupling efficiency. If an optical output source that is generating a signal is off, then step 603 turns it on in a low-power, low-current setting. If the optical output source is turned on before step 603, step 603 changes its power/current to a low setting. At this point, step 605 places a heat-sensitive attachment means over the optical fiber and activates a medium power localized heating means over the heat-sensitive attachment means to desirably secure the optical fiber in place. Step 607 obtains top and side camera images of the optical fiber in order to identify any misalignment from step 601 which may have occurred during one or more of steps 603 and 605. Step 609 obtains a preload direction by comparing the position of the optical fiber in the images obtained in step 607 to the images of the aligned fiber obtained in step 601.

Step 611 then determines if there is a need for a preload. If, in step 611, it is determined that there is no need for a preload, then control transfers to step 615. If there is, the process moves to step 613 where a preload adjustment is made by applying a preload force in the preload direction and subsequently (or simultaneously) activating a high power localized heating means over the heat-sensitive attachment means. Control may then transfer over PATH1, where step 607 would again take top and side camera images in order to determine a further preload direction. This process may continue until the optical fiber achieves the alignment originally obtained in step 601.

The application of a preload force is generally limited to forces that may be a small percentage of the tensile strength of the optical fiber in use. This is so that the bending of the optical fiber does not introduce breaks, cracks, or other undesirable damage as a result of bending. Generally, this creates the need for multiple Mode 2 preload adjustments. Therefore, in an alternate embodiment, step 613 may define a complete preload schedule that moves the optical fiber back to a desired alignment, whereby the preload and activation of the localized heating means occur iteratively pursuant to the preload schedule without the need for further top and side camera images on each iteration. In such an embodiment, once the preload schedule has been executed, control transfers directly to step 615 over PATH2.

Step 615 changes the optical power source to a high power/current setting. If the coupling efficiency observed at this point is at a desired value, then the process ends. The process, however, generally proceeds to step 617 for Mode 3 fine alignment, where a low power localized heating means is activated over the heat-sensitive attachment means in order to cause a vertically downward shift of the optical fiber. If a desired coupling efficiency is detected in step 619, the process moves to the end state 699. Step 617 may be performed any number of times as desired until the desired coupling efficiency is detected. If, in step 617 it is detected that the coupling efficiency is below a certain threshold (not shown in FIG. 7), then the process may transfer control back to step 607, where top and side camera images are taken in order to assess the possible need for further mode 2 preload adjustments.

In one embodiment of the present invention, a low power/current setting of the optical source may be 200–600 mA (50–250 mW), a high power/current setting of the optical source may be 1.1–6 A (0.7–4 W), and low, medium, and high power localized heating means may include activating at least one laser to emit at least one beam of light having: a low energy pulse of 13–18 W, with pulse width of 20 to 30 ms and a duty cycle of approximately 80%; a medium energy pulse of 20–30 W, with pulse width of 0.5–6 s; and a high energy pulse of 25–35 W, with pulse width of 20–80 ms. When it is desirable to use more than one pulse, there may be a 4–8 ms pause in between consecutive pulses.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed:

1. A method of aligning an optical fiber to an optical output port, the method comprising the steps of:
    a) aligning the optical fiber to the optical output port;
    b) attaching the optical fiber to a mount pad region by applying heat to a heat sensitive attachment means, wherein at least a vertical misalignment of the fiber and optical output port is caused thereby; and
    c) activating a localized heating means to generate heat on the attachment means of the attached fiber to adjust the fiber at least vertically toward a desired position.

2. The method according to claim 1, wherein the step of attaching the optical fiber to the mount pad region using the attachment means includes the steps of:
    b1) providing solder as the heat sensitive attachment means on at least an end section of the optical fiber and over the mount pad region; and
    b2) applying the localized heating means to generate heat on, and reflow, the solder.

3. The method according to claim 2, wherein the step of applying the localized heating means includes the step of activating one or more lasers to emit at least one continuous beam of light, where the at least one beam is incident on the solder.

4. A method according to claim 1, wherein
step b) Comprises the steps of:
    b1) obtaining top and side camera images of the optical fiber with the attachment means thereon;
    b2) determining a preload direction in which to apply a preload force by comparing the top and side camera images to the desired position of the optical fiber;
    b3) applying the preload force in the preload direction determined in step (b2); and
step c) causes the solder to reflow, allowing the fiber to move under influence of the preload force.

5. The method according to claim 4, wherein the step of activating the localized heating means includes the step of activating at least one laser to emit at least one beam of light, where the at least one beam is incident on the solder.

6. The method according to claim 4, wherein steps (b3) and (c) are performed simultaneously.

7. A method according to claim 4, further comprising the step of repeating steps (b1)–(c) until the optical fiber is substantially aligned in the desired position.

8. A method according to claim 1, further comprising the steps of activating an optical component to emit an optical signal from the optical output port and monitoring an optical power meter to determine coupling efficiency between the optical fiber and the optical output port and, thus, alignment between the optical fiber and the optical output port.

9. A method according to claim 1, wherein step (c) is repeated until the optical fiber substantially achieves a desired coupling efficiency with the optical output port.

10. The method according to claim 1, wherein the step of activating the localized heating means includes the step of activating at least one laser to emit at least one beam of light, where the at least one beam is incident on the heat sensitive attachment means.

11. A method according to claim 1, further comprising the step of further adjusting the optical fiber horizontally to the optimized position.

12. An apparatus including an optical fiber aligned to an optical output port according to the method of claim 1.

13. The apparatus according to claim 12, wherein the optical fiber is one of a metallized wedge-lensed fiber, a metallized ball fiber, a metallized conical fiber, a metallized flat-cleaved fiber, a non-metallized wedge-lensed fiber, a non-metallized ball fiber, a non-metallized conical fiber, and a non-metallized flat-cleaved fiber.

14. The apparatus according to claim 12, wherein the heat sensitive attachment means is one of a metallic solder and a glass solder.

15. The apparatus according to claim 12, wherein one of a single-mode semiconductor laser and a multi-mode semiconductor laser generates a signal emitted from the optical output port.

16. A method of aligning an optical fiber to an optical output port providing an optical signal from an optical source, the method comprising the steps of:
    a) providing an optical fiber aligned to an optical output port;
    b) obtaining multiple images of the aligned optical fiber;
    c) placing a heat-sensitive attachment over the aligned optical fiber;
    d) activating a localized heating means over the heat-sensitive attachment to secure the optical fiber in place, wherein one or more of steps c and d cause a misalignment of the optical fiber;
    e) obtaining further multiple images of the optical fiber and comparing the further images to the imagines obtained in step b to identify the misalignment;
    f) applying a first preload force in a first preload direction; and
    g) activating a further localized heating means over the heat-sensitive attachment to cause a shift in the fiber in the preload direction to correct the misalignment.

17. The method according to claim 16, further comprising the steps of:
    e1) generating a preload schedule having one or more sequential preload directions each having a preload force; and
    g1) repeating steps f and g for further preload direction and forces of the preload schedule.

18. The method according to claim 16, further comprising the steps of:
    h) setting the optical source to a high power setting;
    i) activating a final localized heating means over the heat-sensitive attachment to cause a vertical shift of the fiber;
    j) monitoring optical coupling efficiency with a power meter; and
    k) repeating steps i and j as necessary to achieve a predetermined coupling efficiency.

* * * * *